United States Patent
O'Herlihy et al.

(10) Patent No.: US 12,013,252 B2
(45) Date of Patent: *Jun. 18, 2024

(54) SYSTEM AND METHOD FOR PERFORMING MULTIVARIATE OPTIMIZATIONS BASED ON LOCATION DATA

(71) Applicant: Uber Technologies, Inc., San Francisco, CA (US)

(72) Inventors: Michael O'Herlihy, San Francisco, CA (US); Nirveek De, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,042

(22) Filed: Jun. 23, 2022

(65) Prior Publication Data

US 2022/0316903 A1    Oct. 6, 2022

Related U.S. Application Data

(63) Continuation of application No. 16/419,795, filed on May 22, 2019, now Pat. No. 11,371,858, which is a (Continued)

(51) Int. Cl.
*G01C 21/36* (2006.01)
*G01C 21/34* (2006.01)
(Continued)

(52) U.S. Cl.
CPC ..... *G01C 21/3617* (2013.01); *G01C 21/3484* (2013.01); *G06Q 30/02* (2013.01); *G06Q 50/40* (2024.01); *G06N 5/01* (2023.01)

(58) Field of Classification Search
CPC ............ G01C 21/3617; G01C 21/3484; G06Q 30/02; G06Q 50/30
(Continued)

(56) References Cited

U.S. PATENT DOCUMENTS 4,750,197 A    6/1988  Denekamp
6,195,648 B1   2/2001  Simon
(Continued)

FOREIGN PATENT DOCUMENTS

CN    106127329    11/2016
EP    1156462      11/2005
(Continued)

OTHER PUBLICATIONS

International Search Report and Written Opinion in PCT/US2016/026799 dated Jul. 28, 2016.
(Continued)

*Primary Examiner* — Peter D Nolan
*Assistant Examiner* — Luke Huynh
(74) *Attorney, Agent, or Firm* — Mahamedi IP Law LLP

(57) ABSTRACT

An optimization and recommendation engine can receive user location data to programmatically generate customized recommendations regarding the user's operation as a potential service provider for a network service. The optimization and recommendation engine can determine potential service routes based on the user location data indicating a frequent route of the user and on service data associated with the network service. The optimization and recommendation engine can also perform multivariate optimizations to select one or more optimal service routes from the potential service routes. The recommendations can include the one or more optimal service routes as well as parameters associated with such routes. The recommendations can further include a comparison of the parameters against characteristics of the user's frequent route.

20 Claims, 5 Drawing Sheets

Related U.S. Application Data continuation of application No. 15/436,614, filed on Feb. 17, 2017, now Pat. No. 10,371,542.

(51) Int. Cl.
  *G06Q 30/02*     (2023.01)
  *G06Q 50/40*     (2024.01)
  *G06N 5/01*      (2023.01)

(58) Field of Classification Search
  USPC ........................................................ 701/424
  See application file for complete search history.

(56) References Cited

U.S. PATENT DOCUMENTS

| | | | |
|---|---|---|---|
| 6,263,435 B1 | 7/2001 | Dondeti | |
| 8,010,285 B1 | 8/2011 | Denise | |
| 8,417,448 B1 | 4/2013 | Denise | |
| 8,417,449 B1 | 4/2013 | Denise | |
| 8,538,158 B1 | 9/2013 | Denise | |
| 8,554,468 B1 | 11/2013 | Bullock | |
| 8,670,930 B1 | 3/2014 | Denise | |
| 8,718,926 B1 | 5/2014 | Denise | |
| 8,762,048 B2 | 6/2014 | Kosseifi | |
| 8,915,738 B2 | 12/2014 | Mannino | |
| 8,924,240 B2 | 12/2014 | Depura et al. | |
| 8,934,719 B1 | 1/2015 | Denise | |
| 8,958,822 B2* | 2/2015 | Liang | H04W 4/029 340/988 |
| 9,097,545 B1 | 8/2015 | Denise | |
| 9,898,759 B2 | 2/2018 | Khoury | |
| 10,129,221 B1 | 11/2018 | McClendon | |
| 2003/0187720 A1 | 10/2003 | Takada | |
| 2005/0131597 A1 | 6/2005 | Raz | |
| 2008/0030376 A1 | 2/2008 | Tunnell | |
| 2008/0252412 A1 | 10/2008 | Larrson | |
| 2008/0255722 A1 | 10/2008 | McClellan | |
| 2009/0088924 A1 | 4/2009 | Coffee | |
| 2009/0192851 A1 | 7/2009 | Bishop | |
| 2009/0234552 A1 | 9/2009 | Takeda | |
| 2010/0020170 A1 | 1/2010 | Higgins-Luthman | |
| 2010/0136994 A1 | 6/2010 | Taylor | |
| 2011/0000747 A1 | 1/2011 | Wu | |
| 2011/0301806 A1 | 12/2011 | Messier | |
| 2011/0301985 A1 | 12/2011 | Camp | |
| 2012/0174111 A1 | 7/2012 | Pala | |
| 2012/0191343 A1 | 7/2012 | Haleem | |
| 2012/0232741 A1 | 9/2012 | Sekiyama | |
| 2012/0232943 A1 | 9/2012 | Myr | |
| 2012/0283893 A1 | 11/2012 | Lee | |
| 2013/0005414 A1 | 1/2013 | Bindra | |
| 2013/0066688 A1 | 3/2013 | Pinkus | |
| 2013/0185221 A1 | 7/2013 | Adams | |
| 2013/0226622 A1 | 8/2013 | Adamson | |
| 2013/0311081 A1 | 11/2013 | Yamakawa | |
| 2013/0345961 A1 | 12/2013 | Leader | |
| 2014/0051465 A1 | 2/2014 | Ruys et al. | |
| 2014/0067434 A1 | 3/2014 | Bourne et al. | |
| 2014/0129951 A1 | 5/2014 | Amin et al. | |
| 2014/0207342 A1 | 7/2014 | Chen et al. | |
| 2014/0309927 A1* | 10/2014 | Ricci | G06V 40/28 701/424 |
| 2014/0358376 A1 | 12/2014 | Phelan | |
| 2015/0095235 A1 | 4/2015 | Dua | |
| 2015/0100505 A1 | 4/2015 | Binion | |
| 2015/0106900 A1 | 4/2015 | Pinski | |
| 2015/0113622 A1 | 4/2015 | Dua | |
| 2015/0161563 A1 | 6/2015 | Mehrabi | |
| 2015/0223024 A1 | 8/2015 | Abuodeh | |
| 2015/0254581 A1 | 9/2015 | Brahme | |
| 2015/0266455 A1 | 9/2015 | Wilson | |
| 2015/0279213 A1 | 10/2015 | Balter | |
| 2015/0293234 A1 | 10/2015 | Snyder | |
| 2015/0302342 A1 | 10/2015 | Yeh | |
| 2015/0307107 A1 | 10/2015 | Tamari | |
| 2015/0324379 A1 | 11/2015 | Danovitz | |
| 2015/0348221 A1 | 12/2015 | Pedersen | |
| 2016/0161275 A1 | 6/2016 | Waltermann | |
| 2016/0232719 A1 | 8/2016 | Brinig | |
| 2016/0337294 A1 | 11/2016 | Garg | |
| 2016/0358388 A1 | 12/2016 | Skoglund | |
| 2016/0373473 A1 | 12/2016 | Truong | |
| 2017/0039890 A1 | 2/2017 | Truong | |
| 2017/0132540 A1 | 5/2017 | Haparnas | |
| 2017/0193625 A1 | 7/2017 | Fan | |
| 2017/0193826 A1 | 7/2017 | Marueli | |
| 2017/0200061 A1 | 7/2017 | Julian | |
| 2017/0227370 A1 | 8/2017 | O'Mahony | |
| 2017/0328725 A1 | 11/2017 | Schlesinger | |
| 2017/0358146 A1* | 12/2017 | Brinig | G07B 15/02 |
| 2017/0358147 A1 | 12/2017 | Brinig | |
| 2017/0371608 A1 | 12/2017 | Wasserman | |
| 2017/0372534 A1 | 12/2017 | Steketee | |
| 2018/0047091 A1* | 2/2018 | Ogden | G06Q 30/0261 |
| 2018/0060990 A1 | 3/2018 | Liu | |
| 2018/0086347 A1 | 3/2018 | Shaikh | |
| 2018/0089605 A1 | 3/2018 | Poornachandran | |
| 2018/0238705 A1 | 8/2018 | O'Herlihy | |
| 2019/0028444 A1 | 1/2019 | McClendan | |
| 2019/0139450 A1 | 5/2019 | Truong | |
| 2019/0265064 A1 | 8/2019 | Koenig | |
| 2019/0271556 A1 | 9/2019 | O'Herlihy | |
| 2020/0074752 A1 | 3/2020 | Brinig | |
| 2020/0209857 A1 | 7/2020 | Djuric | |
| 2020/0219330 A1 | 7/2020 | Brinig | |
| 2021/0065555 A1 | 3/2021 | Kuncl | |
| 2021/0248273 A1 | 8/2021 | Gupta | |
| 2021/0335056 A1 | 10/2021 | Brinig | |
| 2023/0044642 A1 | 2/2023 | Gupta | |

FOREIGN PATENT DOCUMENTS

| | | |
|---|---|---|
| EP | 2767962 | 8/2014 |
| EP | 2700063 | 6/2015 |
| JP | 2014-130552 | 6/2014 |
| KR | 10-2014-0124137 | 10/2014 |
| WO | WO2012080741 A1 | 6/2012 |

OTHER PUBLICATIONS

International Search report in PCT/US2016/016858 dated May 19, 2016.
IPRP in PCT/2016/016858 dated Aug. 17, 2017.
International Search Report and Written Opinion in PCT/US2017/037421 dated Aug. 31, 2017.
IPRP in PCT/US2016/026799 dated Oct. 19, 2017.
Written Opinion issued in SG 11201708199T dated May 7, 2018.
IPRP in PCT/US2017/037421 dated Dec. 27, 2018.
Scott Grimmer, I Got Scammed by an Uber Driver and Customer Service Did What? May 20, 2016.
Examination Report No. 1 in AU 2016215092 dated Nov. 26, 2019.
EESR in EP 178139986 dated Jan. 22, 2020.
Examination Report No. 1 in AU 2016246064 dated May 4, 2020.
Pre-Examination Report dated Jul. 30, 2020 in BR 112017016820-0.
Office Action in CA 3027508 dated Dec. 9, 2020.
EESR in EP 211566765 dated Jul. 1, 2021.
Exam Report No. 1 dated May 3, 2022 in AU 2017286467.
Seow, K.T., "A collaborative multiagent taxi-dispatch system" IEEE Transactions on Automation science and engineering 7(3), 607-617, 2009.

* cited by examiner

SYSTEM AND METHOD FOR PERFORMING MULTIVARIATE OPTIMIZATIONS BASED ON LOCATION DATA

RELATED APPLICATIONS

This application is a continuation of U.S. patent application Ser. No. 16/419,795, filed on May 22, 2019, which is a continuation of U.S. patent application Ser. No. 15/436,614, filed on Feb. 17, 2017, now U.S. Pat. No. 10,371,542; the aforementioned application being incorporated by reference in its entirety.

BACKGROUND

A modern-day mobile computing device is capable of collecting location data that reflect, for example, travel patterns user of the device's user. In addition, a service system for a network service can connect requesting customers with available service providers (e.g., drivers) to facilitate the provision of requested services (e.g., on-demand transportation services) by the available service providers for the requesting customers.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
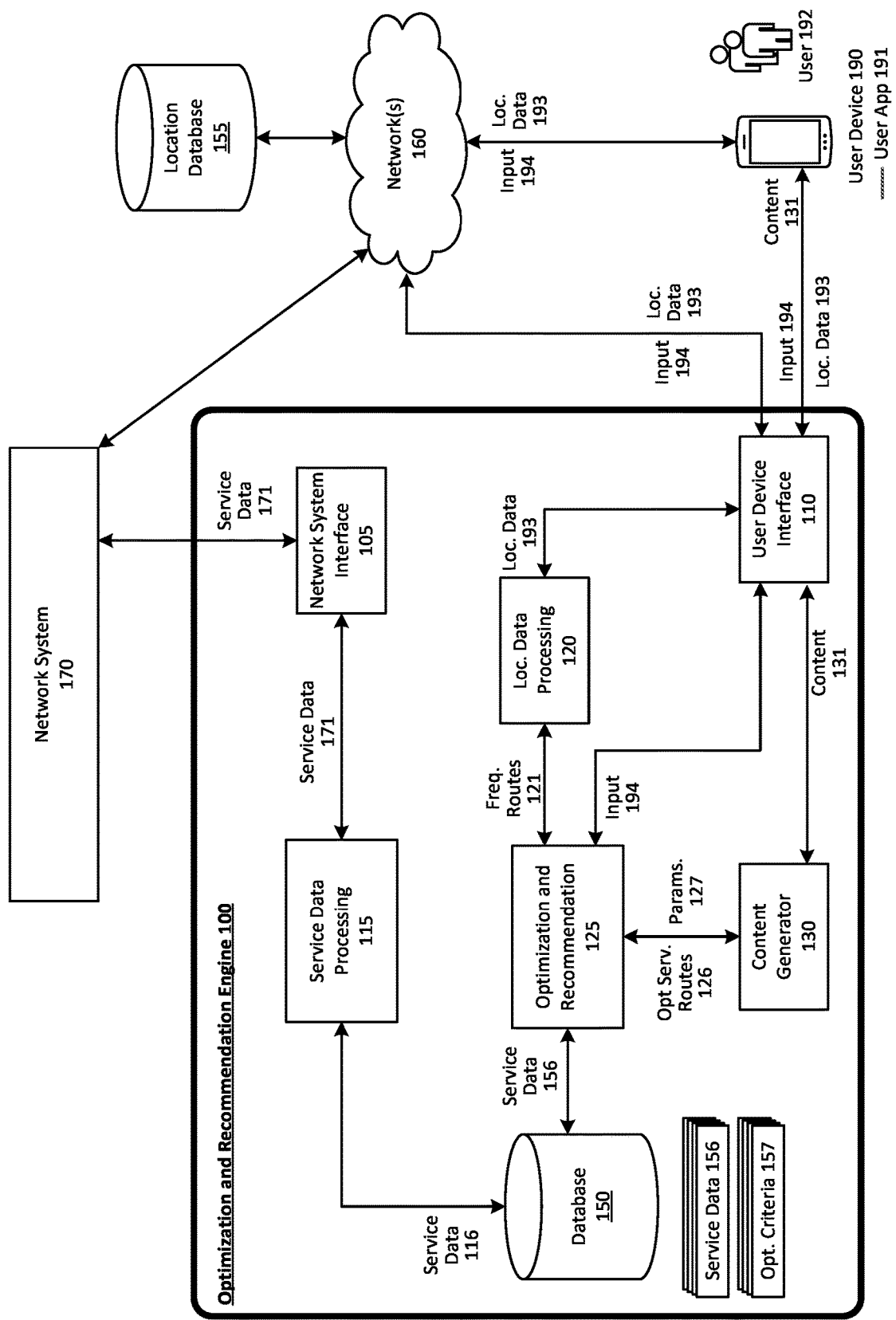
FIG. 1 is a block diagram illustrating an example optimization and recommendation engine, in accordance with examples described herein.

A network service, which is implemented by a computer system(s) (referred to herein as a "network system" for purposes of simplicity), is provided herein that links service providers (e.g., drivers, couriers, autonomous vehicles (AVs), etc.) with requesting customers throughout a given geographic region (e.g., a metroplex such as the San Francisco Bay Area). In doing so, the network service communicates with a pool of service providers in the given geographic region, each operating a vehicle for providing services and one or more computing devices. The network system receives requests for services (e.g., a transport service, a delivery service, etc.) from requesting customers via a designated user or client application executing on the customers' mobile computing devices. In response, the network system identifies one or more available service providers to fulfill each requesting customer's request.

According to embodiments, the network system can record and maintain, in one or more databases, data regarding various aspects of the network service for the given geographic region. For example, the one or more databases can store data corresponding to completed services such as a service-begin locations (e.g., pickup locations), service-end locations (e.g., drop-off locations), respective service-begin and service-end regions, distance covered by the service providers, the times the services were rendered (e.g., 8:00 AM, 5:00 PM, etc.), the durations of the services, the fares paid for the rendered services, etc. The one or more databases can also store data corresponding to, for example, a number of service requests for each sub-region of the given region, the times the service requests were submitted to the network system, the number of service providers available, and the like. Such service data maintained in the one or more databases regarding the various aspects of the network service can be used to determine values used in provisioning the network service. For instance, based on the number of service requests and the number of available service providers in a sub-region at a particular time of the day can be used to determine an appropriate fare for the requested service in the sub-region.

In many instances, it is desirable for the network service to attract service providers to provide the requested services. In the context of a transport service, for example, a commuter can operate a vehicle to provide request services during peak demand times on his or her way from home to work and vice versa. However, it can be difficult for a commuter to understand the cost (e.g., additional miles or time incurred on the commute, etc.) and benefits (e.g., time savings due to use of high occupancy vehicle (HOV) lanes, earnings from fares, etc.) of operating as a service provider during his or her commute. For instance, demand (e.g., number of service requests) for the network service in the given region managed by the network system can vary widely over time. Demand can also vary based on location as well. Some locations within the given region may have different peak demand times compared to other locations. In addition, travel patterns (e.g., intended destinations or direction of travel) of requesting customers may vary based on time and location as well. Furthermore, fares for the network service can also vary. With so many variables, it can be impossible for a commuter to quantify costs and benefits associated with operating as a service provider as part of the commuter's routine commute. Accordingly, under conventional implementations of the network service, the commuter must undertake a try-and-see approach to determine the costs and benefits of operating as a service provider on his or her commute. This may be undesirable because the unknown costs and benefits of operating as a service provider, without a try-and-see approach, can be a barrier for many commuters to operate as service providers for the network service.

As described herein, an optimization and recommendation engine can receive or access historical location data of a user of a mobile computing device. The optimization and recommendation engine can identify a set of location data corresponding to a frequent route of the user (e.g., commute to and/or from work). The optimization and recommendation engine can further receive service data associated with the network service. Based on the set of location data and the service data, the optimization and recommendation engine can determine a plurality of potential service routes for the user (e.g., potential route in fulfilling service requests for the network service). For each potential service route, the optimization and recommendation engine can determine a set of parameters, such as estimated earnings, estimated route duration, and estimated route distance. By optimizing one or more of these parameters, the optimization and recommendation engine can identify one or more optimal potential service routes for the user. The optimization and recommendation engine can be configured to generate recommendations for the user. The recommendations can include a graphical display of the one or more optimal potential service routes as well the respective sets of parameters associated therewith.

Among other benefits, embodiments described herein enable a user of a mobile computing device to view individualized, quantifiable, and optimized costs and benefits of operating as a service provider as part of the user's frequently taken trips. For example, the user is able to view the potential service routes based on the user's frequently taken trips. Some examples further enable the user to provide optimization inputs to further customize the recommendations generated by the optimization and recommendation engine. For instance, the user can provide optimization inputs to alter the optimization and recommendation engine to emphasize one aspect of the optimization (e.g., potential profit) over another (e.g., distance traveled). In this manner, the user is able to view optimized (e.g., based on the user's routes, service data, and/or user input) costs and benefits of operating as a potential service provider without the need to conduct a try-and-see approach.

According to embodiments, a mobile computing device operated by a user can include a geo-aware resource (e.g., GPS receiver, GLONASS receiver, etc.) that can generate location data corresponding to the precise location of the mobile computing device (and the user). The location data can be stored locally on a storage device (e.g., solid state or flash memory) of the mobile computing device or can be stored on one or more remote servers (e.g., cloud storage). According to embodiments, the mobile computing device can record location data when a user application program (e.g., a mapping program, a route guidance program, or a user application associated with the network service) is being executed on the mobile computing device as an active program (e.g., foreground execution) or when the user application program is being executed on the mobile computing device as a background program (e.g., background execution). In certain implementations, the location data is collected as part of the operation of the operating system of the mobile computing device.

According to embodiments, an optimization and recommendation engine can receive historical location data recorded by the mobile computing device and the service data from the network system (and/or the one or more databases) to perform multivariate optimizations in generating recommendations for the user of the mobile computing device. The optimization and recommendation engine can receive the historical location data from a server of a third party service (e.g., a mapping service, a route guidance service, etc.). In addition to or as an alternative, the optimization and recommendation engine can receive the historical location data from the mobile computing via a bus such as through a universal serial bus (USB) connection. The received historical location data can indicate the precise location of the mobile computing device over a period of time. Based on the particular implementation, the number of data points included in the historical location data can vary. For instance, in one implementation, the historical location data can include data points indicating the location of the mobile computing device every thirty seconds. In another implementation, the historical location data can include data points indicating the location of the mobile computing device every minute.

In examples described herein, the optimization and recommendation engine can parse the historical location data recorded by the mobile computing device to identify a set of location data corresponding to a frequent route taken by the user. The frequent route can be a route the user takes on a regular basis (e.g., trip from home to work, trip from work to home, trip to school, etc.). The optimization and recommendation engine can do so by identifying sets of data that indicate repeat travel patterns of the user. The optimization and recommendation engine can parse the historical location data for a frequent route that is taken on a daily, weekly, or monthly basis. The optimization and recommendation engine can identify a start location and a destination location for the frequent route based on the identified sets of data. The optimization and recommendation engine can also identify characteristics (e.g., travel time, travel distance, tolls paid) of the frequent route.

In various aspects, the optimization and recommendation engine can programmatically determine, based on the set of location data corresponding to the frequent route, a plurality of potential service routes for the user. A potential service route can be a route the user can expect to take in providing services as a service provider for the network service in place of the user's frequent route. The service route can include a service-begin region (e.g., a region in which the user can expect to pick-up requesting customers) and a service-end region (e.g., a region in which the user can expect to drop-off requesting customers. For example, a potential service route can be determined for a user to take in fulfilling service requests in place of the user's usual commute from home to work. In this context, the user can expect to travel from home to the service-begin region (e.g., to pick-up a requesting customer) and travel to the service-end region (e.g., to drop-off the requesting customer) and subsequently travel from the service-end region to work. Some service routes (e.g., service routes corresponding to ride-pooling services) can include multiple service-begin and service-end regions.

According to embodiments, the determination of the plurality of service routes can be based on the set of data corresponding to the frequent route of the user and on the received service data. To determine the plurality of service routes, the optimization and recommendation engine can first identify a plurality of service-begin regions. A service-begin region can be a sub-region (e.g., a city block, a geographical neighborhood, etc.) within the given region managed by the network system where the user, as a service provider for the network service, can begin rendering requested services for requesting users (e.g., to pick-up requesting customers). The service-begin regions can be determined based on the set of location data corresponding to the frequent route of the user. For example, the optimization and recommendation engine can identify service-begin regions based on their respective proximity to the origination location of the frequent route. The service-begin regions can also be identified based on the service data indicating, for example, a number of service requests. For instance, a particular region can be identified as a service-begin region due to service data indicating a high number of service requests originating in that region. The identification of service-begin regions can also be based on the time of the frequent route of the user. For instance, if the set of location data indicates that the user's frequent route usually begins at 8:00 AM, the optimization and recommendation engine can identify the service-begin regions based on the 8:00 AM start time. As an example, for a frequent route of the user beginning at 8:00 AM, the optimization and recommendation engine can identify a residential area in close proximity to the user's frequent route as a service-begin region. The residential area can be identified based on service data indicating that it is a region of high demand (e.g., a large number of requests from customers for pick-up within the residential area) at or around 8:00 AM.

In various aspects, the optimization and recommendation engine can further identify a number of service-end regions to determine the plurality of potential service routes. The optimization and recommendation engine can determine, for each service-begin region, a number of service-end regions to determine service routes originating from the service-begin region. The determination of service-end regions can be based on the set of data corresponding to the frequent route and based on the service data. For instance, the optimization and recommendation engine can determine, based on the service data, travel patterns (e.g., high-demand destinations or routes) of requesting customers originating from a particular service-begin region to identify the service-end regions for the particular service-begin region. Using the previous example of a frequent route of the user taken at 8:00 AM, the optimization and recommendation engine can determine that a high-demand destination of requesting customers originating from the service-begin region (e.g., the identified residential area) is a business park where many of the residents of the residential area work. Based on this determination, the optimization and recommendation engine can identify the business park (or a region that includes the business park) as a service-end region. The optimization and recommendation engine can also filter out service-end regions based on set of location data corresponding to the frequent route of the user. For instance, if the business park is located too far from the destination of the user's frequent route (or represents too big of a detour from the user's frequent route), the optimization and recommendation engine can eliminate the business park as a service-end region.

In the examples described herein, the optimization and recommendation engine can determine a set of parameters for each of the plurality of service routes. Such parameters can include expected earnings for the service route, route duration, and route distance. The set of parameters can be determined based on service data. For instance, by analyzing the service data, the optimization and recommendation engine can determine an average or a mean measure of earnings of service providers fulfilling services following the potential service route. The optimization and recommendation engine can also determine the route duration based on past trips service providers completed following the potential service route. In addition, or as an alternative, the route duration can be determined based on historical traffic data. Furthermore, the parameters can include a toll amount indicating an amount of tolls (e.g., expressway tolls, bridge tolls, etc.) the user can expect to pay in following the potential service route.

According to embodiments, the optimization and recommendation engine can perform multivariate optimizations of the sets of parameters associated with the plurality of service routes to select one or more of the service routes in generating a recommendation for the user. For instance, the optimization and recommendation engine perform the multivariate optimizations maximize the earnings while minimizing the route duration and/or route distance in selecting one or more service routes. The optimization and recommendation engine can perform such optimizations by associating a weight with each of the set of parameters. In this manner, the optimization and recommendation engine can attempt to minimize or maximize a sum of the weights associated with each of the parameters in performing the optimization. By performing such optimizations, the optimization and recommendation engine can select one or more service routes that may be particularly suitable for the user. For instance, the one or more optimal service routes may have higher earning potential than other potential service routes. The one or more optimal service routes may also represent a minimum amount of detour from the frequent route of the user (e.g., measured in distance or travel time) compared with other potential service routes. In one example, the optimization and recommendation engine can determine a service route to maximize earning potentials of the user. In another example, the optimization and recommendation engine can determine a service route to minimize the user's travel distance (e.g., minimizing the distance from the start location to the service-begin region to the service-end region and to the destination location). In yet another example, the optimization and recommendation engine can determine a service route to minimize the user's travel time. In doing so, the optimization and recommendation engine can, for example, determine the service route such that the user is able to take advantage of HOV lanes while transporting a customer.

According to embodiments, the optimization and recommendation engine can generate content for display for the user. The content can include recommendations for the user generated based on the multivariate optimizations. For instance, the content can include a graphical display (e.g., by overlaying on a map) of the user's historical locations, the user's frequent route, and the one or more optimal service routes. The content can further include one or more parameters determined for the one or more optimal service routes. For example, the content can include graphical user interface features indicating, for example, the expected earnings, expected travel time, and/or travel distance for the one or more optimal service routes. Furthermore, the recommendations generated by the optimization and recommendation engine can include a comparison of the one or more optimal service route against the frequent route. For example, the recommendations can include a comparison of the parameters determined for the one or more optimal routes against the characteristics determined for the frequent route of the user. For example, the recommendations can include a comparison of the travel time of an optimal route against the travel time of the frequent route.

In certain implementations, in identifying a frequent route of the user based on historical location data, the optimization and recommendation engine can identify non-driving routes. Non-driving routes can be routes that the user typically takes without the use of an automobile. Such routes can include routes the user takes via public transportation, by bicycling, by walking, etc. The optimization and recommendation engine can identify such unsuitable routes based on the historical location data. For instance, if the historical location data corresponding to a route indicates that the path of travel of the user corresponds to a sidewalk, a bicycle path, or a public transit route (e.g., a bus route or a train route), the optimization and recommendation engine can identify the route as a non-driving route. In addition, if the historical location data corresponding to a route indicates that the user's rate of travel is consistent with that of a mode of public transportation (e.g., indicating frequent stops, consistent with a bus or train schedule, etc.), bicycling, or walking, the optimization and recommendation engine can identify the route as a non-driving route. In some examples, the optimization and recommendation engine can ignore non-driving routes as unsuitable for determining potential service routes. In other examples, the optimization and recommendation engine can generate a recommendation for the user based on the user's non-driving routes (e.g., to recommend the user to operate an automobile on the route).

In some examples, recommendations generated by the optimization and recommendation engine for the user can include a recommendation to begin the one or more optimal service routes at a different time compared to the start time of the user's frequent route. For example, the user may begin a frequent route (e.g., to work) at 8:00 AM. By analyzing the service data and optimizing for various parameters, the optimization and recommendation engine can determine that the user can achieve maximized potential earnings and reduced travel time if the user begins travel at 7:30 AM as a potential service provider. Thus, the optimization and recommendation engine's recommendations can include the one or more optimal service routes as well as a separate recommendation for the user to begin travel at 7:30 AM as a potential service provider. The user may be able to select between the normal start time (8:00 AM) and the recommended start time (7:30 AM), and view the parameters such as expected earnings and expected route time based on the selection.

According to embodiments, the optimization and recommendation engine can receive optimization inputs from the user to determine the optimal service routes. For instance, optimization inputs from the user can include a maximum additional distance or maximum additional time the user will accept in comparison to the user's frequent route. In response, the optimization and recommendation engine can select service-begin regions, service-end regions, or optimal service routes based on the user input. In addition, the user can vary the weights associated with the various parameters the optimization and recommendation engine uses to determine the optimal routes. For instance, the user can enter optimization inputs that alter the weight attached to, for example, the expected earnings in performing multivariate optimizations to select one or more optimal routes. In response to the user input, the optimization and recommendation engine can place additional weight on the expected earnings in selecting one or more optimal routes from the plurality of potential service routes. In this manner, the user can further customize the optimizations performed by the optimization and recommendation engine in generating recommendations for the user.

As used herein, a mobile computing device refers to devices corresponding to cellular devices or smartphones, personal digital assistants (PDAs), laptop computers, GPS navigation systems, smartwatches, virtual reality (VR) or augmented reality (AR) headsets, tablet devices, etc., that can provide network connectivity and processing resources for communicating with the system over a network. A mobile computing device can also correspond to custom hardware, in-vehicle devices, or on-board computers, etc. The mobile computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 a block diagram illustrating an example optimization and recommendation engine, in accordance with examples described herein. A network system 170 can manage a network service that connects requesting customers with service providers that are available to service the customers' service requests. The network service can provide a platform that enables on-demand services (e.g., ride-sharing services, transport services, delivery services, etc.) between requesting customers and available service providers by way of a customer application executing on the customer devices, and a service provider application executing on the provider devices. In particular, in response to a customer request from a customer device over a network(s) 160 (e.g., the Internet), the network system 170 can identify a suitable available service provider to fulfill the request and transmit an invitation, to the provider device of the suitable available service provider, to fulfill the service request.

According to embodiments, an optimization and recommendation engine 100 can generate optimized recommendations for a user 192 based on historical location data of the user. The recommendations can be relevant to the network service (e.g., an on-demand transport service) managed by the network system 170. In particular, the recommendations can relate to the user's 192 participation as a potential service provider to fulfill service requests (e.g., pick-up requests) from customers of the network service. The recommendations can include one or more optimal service routes determined by optimization and recommendation engine 100 based on the user's 192 historical location data. The optimization and recommendation engine 100 can recommend one or more optimal service routes that are deemed suitable for the user 192 based on frequent routes the user 192 takes (e.g., commute to or from work, etc.). Furthermore, the recommendations can include parameters such as expected earnings, duration, and distance associated with the one or more optimal service routes.

In various aspects, the optimization and recommendation engine 100 includes a network system interface 105 to receive service data 171 from the network system 170. Service data 171 can include data pertaining to past service requests. For instance, service data 171 can include data regarding a number of service requests requesting pick-ups at a particular location or area at a certain time of day (e.g., Mondays at 8:00 AM). Service data 171 can also include data regarding the requested drop-off or destination locations of service requests. In some implementations, fares of the network service may vary over region and/or time. As such, service data 171 can further include information regarding fares of the network service. Based on the received service data 171, the optimization and recommendation engine 100 can determine, for example, areas of high demand (e.g., areas having a high number of pick-up requests, areas having a high number of drop-off requests, etc.), travel patterns of customers of the network service in order to determine one or more optimal service routes for the user 192.

According to embodiments, the optimization and recommendation engine 100 includes service data process 115 to process the received service data 171. In addition, the optimization and recommendation engine 100 includes a database 150 to store the processed service data 116 as service data 156. In addition, the database 150 can store optimization criteria 157 that are used to perform optimizations in determining the one or more optimal service routes for the user 192. For instance, optimization criteria 157 can indicate weights placed on certain parameters (e.g., travel distance, potential earnings, travel time, etc.) used to perform multivariate optimizations in determining the one or more optimal routes for the user 192.

In certain implementations, the user 192 operates a user device 190 that records location data of the user 192. The user device 190 can be a mobile computing device such as a smartphone, a tablet, a laptop computer, or a smartwatch. The user device 190 can also be a GPS navigation system. The user device 190 includes a geo-aware resource (e.g., GPS or GLONASS receiver) that determines and records the location of the user device 190. In certain examples, the user device 190 is configured to record location data 193 when a user application 191 is executing either in the foreground or in the background. In other examples, the recording of location data 193 is performed by an operating system of the user device 190.

In the examples described herein, a user device interface 110 of the optimization and recommendation engine 100 can communicate with the user device 190 to receive location data 193. The user device interface 110 can receive the location data 193 from the user device 190 via network 160 or via an interconnect or a bus (e.g., Universal Serial Bus (USB)). In some implementations, for example, the user application 191 can cause the user device 190 to transmit historical location data over the network 160 to the location database 155 for storage. Thus, the user device interface 110 can also receive the location data 193 from a location database 155 over the network 160. The location database 155 can be a database maintained by, for example, a cloud mapping service that stores historical location data of the mapping service's users.

According to embodiments, the optimization and recommendation engine 100 can include location data processing 120 to determine one or more frequent routes 121 of the user 192 based on the received location data 193. The location data processing 120 can determine the one or more frequent routes by identifying repeated user location patterns (e.g., repeated start and destination locations) of the user 192 based on the location data 193. For instance, the location data processing 120 can parse the location data 193 to determine that the user 192 takes a frequent route on a daily basis or every weekday. The location data processing 120 can similarly identify frequent routes the user 192 takes on a weekly or monthly basis. In some implementations, the determination of a frequent route includes determining a start time associated with the frequent route. For example, the location data processing 120 can determine that the user 192 takes the identified frequent route every weekday at 8:00 AM.

According to embodiments, optimization and recommendation 125 determines one or more optimal routes 126 based on the identified frequent routes 121 (or location data corresponding to the frequent routes) and the service data 156. The optimization and recommendation 125 can first determine a plurality of potential service routes. As described with respect to FIG. 2, the optimization and recommendation 125 can do by identifying a plurality of service-begin regions and a plurality of service-end regions based identified frequent route for the user 192. After determining a plurality of potential service routes, the optimization and recommendation 125 can determine parameters (e.g., potential earnings, travel time, travel distance, tolls) associated with each of the plurality of potential service routes. Thereafter, the optimization and recommendation 125 can perform multivariate optimizations of the parameters to select one or more optimal service routes from the plurality of potential service routes. For example, the optimization and recommendation 125 can select a potential service route that maximizes potential earnings while minimizing travel distance as the optimal service route. The optimization and recommendation can output the selected one or more optimal service routes as optimal service routes 126 and parameters associated with the one or more optimal service routes as parameters 127.

In various aspects, content generator 130 of the optimization and recommendation engine 100 can generate content 131 for transmission to the user device 190 (or another computing device of the user, e.g., a desktop computer) to enable the user 192 to view the optimal service routes and the parameters associated therewith.

Figure 2:
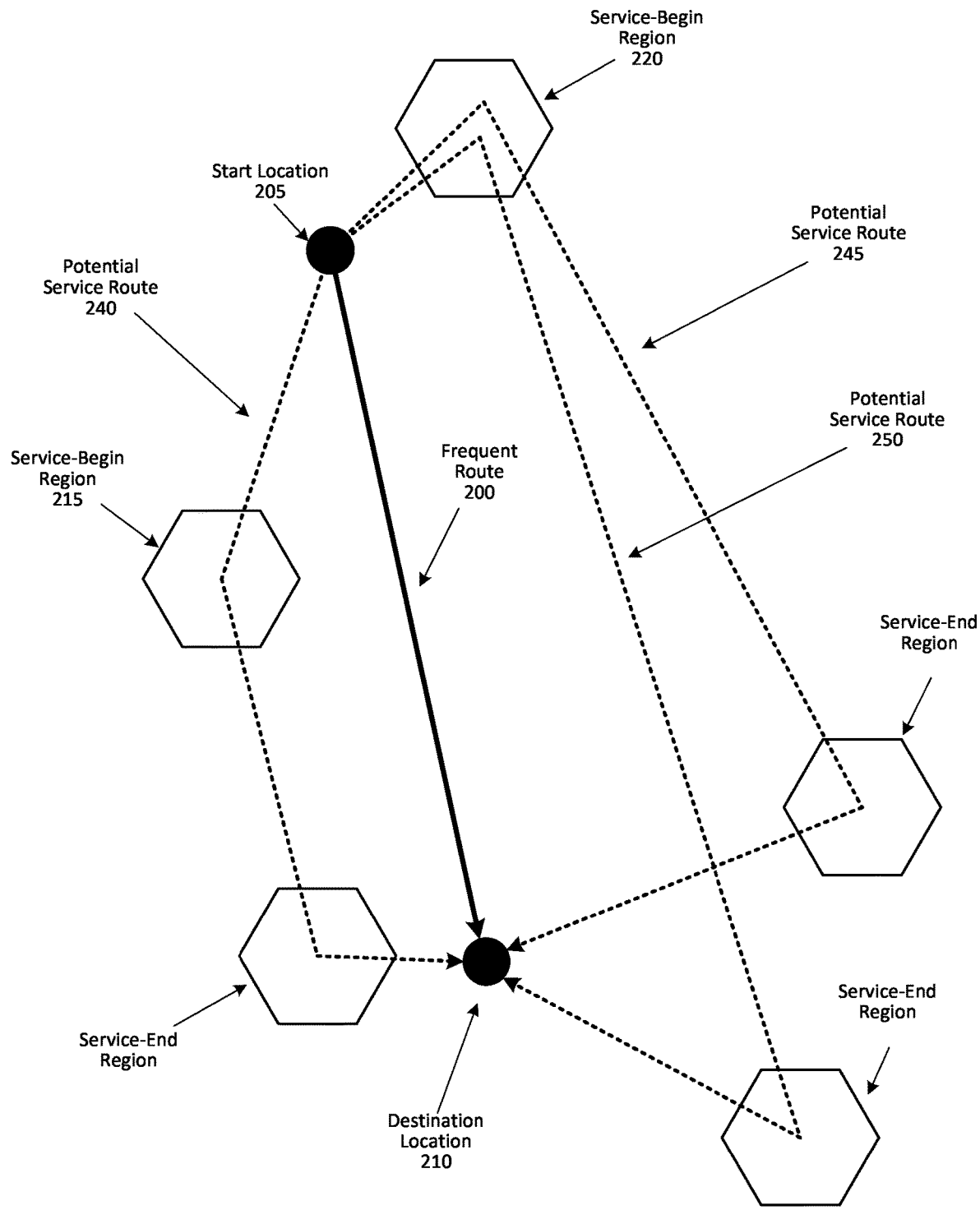
FIG. 2 is a figure depicting a representation of an exemplary frequent route of a user, as well as a plurality of potential service routes, in accordance with examples described herein.

FIG. 2 is a figure depicting a representation of an exemplary frequent route of a user, as well as a plurality of potential service routes, as described herein. In the below discussion of FIG. 2, reference may be made to features and examples shown and described with respect to FIG. 1. In particular, the exemplary frequent route and the plurality of potential service routes can be determined by an exemplary optimization and recommendation engine such as optimization and recommendation engine 100 of FIG. 1.

Referring to FIG. 2, a frequent route 200 of a user (e.g., user 192) can be from a start location 205 to a destination location 210. For purposes of discussion and simplicity, frequent route 200 (and the plurality of potential service routes depicted in FIG. 2) are represented in the manner illustrated in FIG. 2. It is understood that, in practice, such routes follow streets, roads, expressways, highways, and the like. In some examples, as described herein, a frequent route 200 can be a portion of the entire route (e.g., a route segment) traveled from a start location 205 to a destination location 210. The frequent route 200, as well as the start location 205 and destination location 210 can be determined by the optimization and recommendation engine 100 using location data 193 of the user 192. The frequent route 200 can be a route the user takes on a routine basis, such as a commute route from home to work or vice versa. In some examples, the optimization and recommendation engine 100 can determine from the location data 193, a start time associated with the frequent route 200 of the user 192. The start time can be the average time (e.g., 8:00 AM) the user departs on the frequent route 200. The time can vary based on the day (e.g., 8:00 AM on Monday and 9:00 AM on Tuesdays, etc.). This information can be used by the optimization and recommendation engine 100 to identify service-begin regions 215 and 220.

Based on the identified frequent route 200, the optimization and recommendation engine 100 can identify service-begin regions 215 and 220. The identification of service-begin regions 215 and 220 can be further based on service data 171 received from the network system 170, indicating, for example, information regarding past service history (e.g., service requests, completed services). For instance, the optimization and recommendation engine 100 can identify areas of high demand in the area (e.g., based on a number of past service requests) at the start time associated with the frequent route 200 based on the service data 171. The optimization and recommendation engine 100 can also identify the service-begin regions 215 and 220 such that the resulting potential service routes 240, 245, and 250 are no longer (e.g., in travel distance and/or in travel time) than the frequent route 200 by a certain amount (e.g., 10 additional miles and/or 15 additional minutes).

According to embodiments, the determination of the plurality of service routes can be based on the set of data corresponding to the frequent route of the user and on the received service data. To determine the plurality of service routes, the optimization and recommendation engine can first identify a plurality of service-begin regions. A service-begin region can be a sub-region (e.g., a city block, a geographical neighborhood, etc.) within the given region managed by the network system where the user, as a service provider for the network service, can begin rendering requested services for requesting users (e.g., to pick-up requesting customers). The service-begin regions can be determined based on the set of location data corresponding to the frequent route of the user. For example, the optimization and recommendation engine can identify service-begin regions based on their respective proximity to the origination location of the frequent route. The service-begin regions can also be identified based on the service data indicating, for example, a number of service requests. For instance, a particular region can be identified as a service-begin region due to service data indicating a high number of service requests originating in that region. The identification of service-begin regions can also be based on the time of the frequent route of the user. For instance, if the set of location data indicates that the user's frequent route usually begins at 8:00 AM, the optimization and recommendation engine can identify the service-begin regions based on the 8:00 AM start time. As an example, for a frequent route of the user beginning at 8:00 AM, the optimization and recommendation engine can identify a residential area in close proximity to the user's frequent route as a service-begin region. The residential area can be identified based on service data indicating that it is a region of high demand (e.g., a large number of requests from customers for pick-up within the residential area) at or around 8:00 AM.

After determining the potential service routes 240, 245, and 250, the optimization and recommendation engine 100 can determine a set of parameters for each of the potential service routes 240, 245, and 250. Such parameters can include potential earnings for the user 192 in following the potential service route as a service provider, travel time, travel distance, tolls to be paid on the service route etc. Such parameters can also include historical and/or predicted traffic conditions on the potential service route. By optimizing these parameters, the optimization and recommendation engine 100 can select one or more optimal service routes from the plurality of potential service routes 240, 245, and 250.

In some examples, content generator 130 can generate content for the user 192 depicting one or more of the potential service routes 240, 245, and 250. For instance, the potential service routes 240, 245, and 250 (or an optimal service route selected therefrom) can be displayed for the user 192. In certain implementations, the user is able to provide an input 194 to alter the optimization process (e.g., weights placed on each of the parameters) in selecting the optimal service route from among the plurality of potential service routes by the optimization and recommendation engine 100.

Methodology

Figure 3:
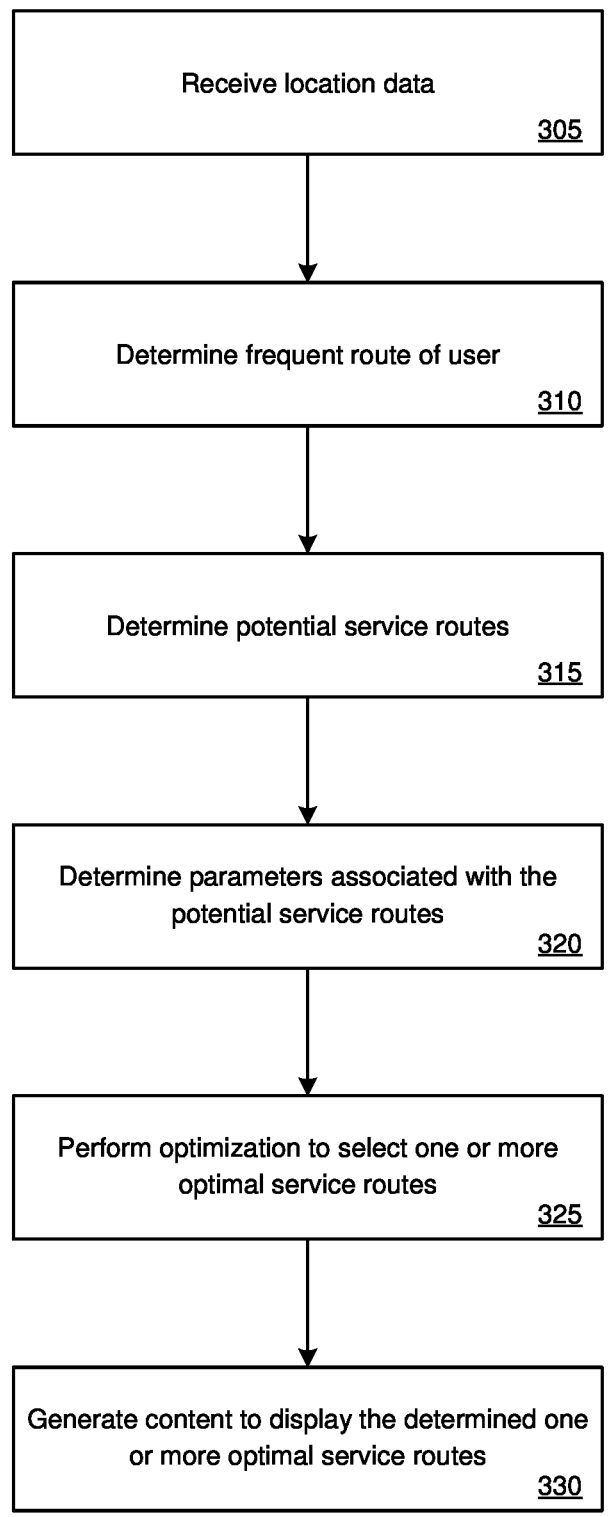
FIG. 3 is a flow chart describing an example method of determining one or more optimal service routes for a user, according to examples described herein.

FIG. 3 is a flow chart describing an example method of determining one or more optimal service routes for a user, according to examples described herein. In the below discussion of FIG. 3, reference may be made to features and examples shown and described with respect to FIGS. 1 and 2. In particular, method described in FIG. 3 may be performed by an exemplary optimization and recommendation engine 100 of FIG. 1.

Referring to FIG. 3, the optimization and recommendation engine 100 can receive location data of a user (305). The location data can be recorded by a mobile computing device operated by the user. The optimization and recommendation engine 100 can receive the location data from the mobile computing device via a network or via a bus (e.g., a USB connection). The location data can be data collected over a period of time such as a week or a month.

According to embodiments, the optimization and recommendation engine 100 can determine a frequent route of the user based on the received location data (310). By parsing and analyzing the received location data, the optimization and recommendation engine 100 can identify frequent locations the user visits and determine a frequent route of the user (e.g., weekday commute route from home to work, etc.). For example, the received location data can include information regarding the geographic coordinates of the mobile computing device of the user (e.g., as determined by a GPS receiver for example) as well as a time associated with the geographic coordinates (e.g., indicating when the mobile computing device recorded a particular geographic coordinate). Using the locations coordinates and the associated times indicated by the received location data, the optimization and recommendation engine 100 can determine that the user routinely (e.g., on a daily basis, every weekday etc.) takes a particular route from a start location to a destination location.

In certain implementations, the optimization and recommendation engine 100 can identify non-driving routes (e.g., routes the user takes via public transportation, by bicycling, by walking, etc.) based on the location data. For instance, if the location data for route of the user indicates that the path of travel of the user corresponds to a sidewalk, a bicycle path, or a public transit route (e.g., a bus route or a train route), the optimization and recommendation engine 100 can identify the route as a non-driving route. The optimization and recommendation engine 100 can ignore a non-driving route in identifying frequent routes taken by the user.

According to embodiments, based on the frequent route of the user, the optimization and recommendation engine 100 can determine a plurality of potential service routes for the user (315). This determination may also be based on service data received from the network system 170 that manages the network service. For example, the optimization and recommendation engine 100 can determine a plurality of service-begin and service-end regions based on both the frequent route of the user and the service data. For example, the optimization and recommendation engine 100 can identify a number of service-begin regions (e.g., a geographic area where the user, operating as a service provider, would rendezvous with requesting customers) and service-end regions (e.g., a geographic area where the user, operating as a service provider, would drop-off customers) to determine the plurality of potential service routes. The determination of the service-begin and service-end regions can be based on the frequent route. For instance, the optimization and recommendation engine 100 determine the service-begin and service-end regions to be in close proximity (e.g., within a certain distance) of the frequent route of the user. The determination of the service-being and service-end regions can also be based on the service data. For instance, the service-begin and service-end regions can be selected based on service data indicating areas of high (or relatively high) demand or fares.

According to embodiments, the optimization and recommendation engine 100 can determine parameters associated with the plurality of potential service routes (320). Such parameters can include, for example, a travel time, a travel distance, potential earnings, tolls, and the like associated with a potential service route. These parameters can be determined based on the service data. For example, based on service data indicating past fares paid by requesting customers on a potential service route, the optimization and recommendation engine 100 can determine potential earnings for the user on the particular potential service route.

In certain examples, the optimization and recommendation engine 100 can determine a travel time by taking into account the use of HOV lanes by the user as a service provider in transporting requesting customers on the one or more potential service routes. The optimization and recommendation engine 100 can estimate the travel time using HOV lanes based on service data that indicate past service providers en-route from a pick-up location to a drop-off location. The optimization and recommendation engine 100 can also determine time savings for the user in taking the HOV lanes as opposed to traveling on non-HOV lanes as a single driver on the user's frequent route.

In various aspects, the optimization and recommendation engine 100 can perform multivariate optimizations to select one or more optimal service routes from the plurality of potential service routes (325). The optimization and recommendation engine 100 can perform such optimizations by associating a weight with each of the parameters and summing the weights associated with the parameters for each of the plurality of potential service routes. In this manner, the optimization and recommendation engine 100 can select the potential service route(s) with the maximum or minimum sum of weights as the one or more optimal service routes. In some examples, the optimization and recommendation engine 100 can generate a first optimal service route that maximizes the user's potential earnings as a service provider, a second optimal service route that minimizes the user's travel time, and a third optimal service route that offers an optimal trade-off between the two parameters based on the respective weights attached to potential earnings and to travel time.

In the examples described herein, the optimization and recommendation engine 100 can generate content to display the one or more optimal service routes (330). Such content data can be transmitted to the mobile computing device (or another computing device) of the user such that the user can view the recommendations generated by the optimization and recommendation engine 100. The content data can enable the mobile computing device (or another computing device) to display the one or more optimal routes (e.g., on a virtual map) and the parameters associated with the one or more optimal service routes (e.g., potential earnings, travel time, etc.). The content data can further enable the mobile computing device (or another computing device) to display a comparison of the parameters against characteristics of the frequent route of the user. For example, the recommendations can include a comparison of the trip duration of an optimal route against the trip duration of the frequent route.

Hardware Diagram

Figure 4:
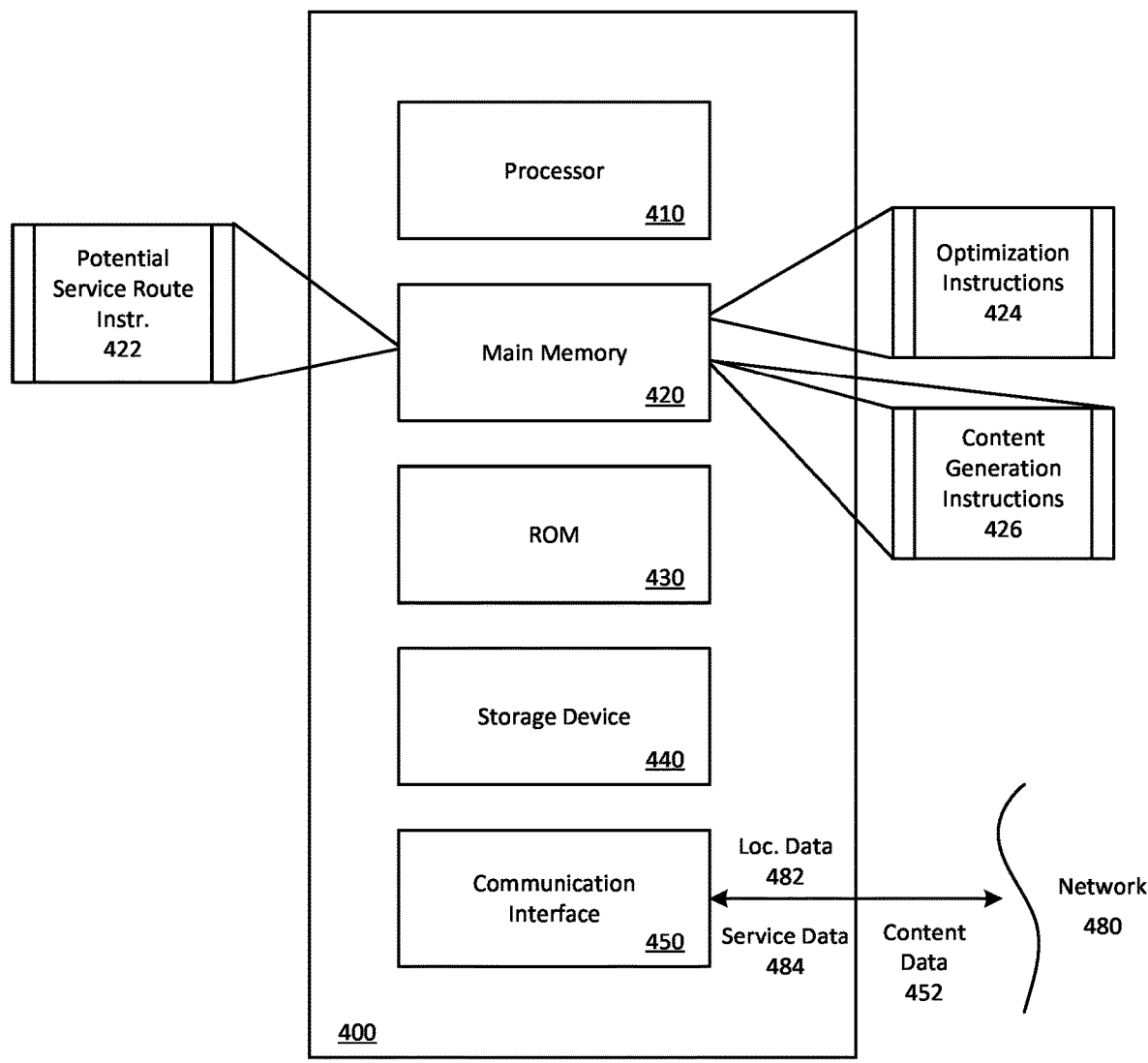
FIG. 4 is a block diagram illustrating a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of an optimization and recommendation engine for determining one or more optimal service routes for a user of a mobile computing device. In the context of FIG. 1, the optimization and recommendation engine 100 may be implemented using a computer system 400 such as described by FIG. 4. The optimization and recommendation engine 100 may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or a flash memory disk, is be provided for storing information and instructions.

The communication interface 450 enables the computer system 400 to communicate with one or more networks 480

(e.g., Internet) through use of a network link. Through the network 480, the computer system 400 can communicate with one or more user computing devices to receive location data 482 of a user. The computer system 400 can also communicating with one or more servers implementing an on-demand transport service (e.g., network system 100) to receive data pertaining to the transport service (e.g., service data 484).

The executable instructions stored in the memory 420 can include potential service route instructions 422, which enable the computer system 400 to determine a plurality of potential service routes for the user based on the user's location data 482 and/or the service data 484. The executable instructions stored in the memory 420 can also include optimization instructions, which enable the computer system 400 to perform multivariate optimizations to select one or more optimal service routes from among the plurality of potential service routes. Additionally, the executable instructions stored in the memory 420 can include content generation instructions 426, which enable the computer system 400 to generate content data 452 for transmission to the user device over network 480. The content data 452 can enable the user device to view the selected one or more optimal routes as well as parameters associated with those routes.

The processor 410 is configured with software and/or other logic to perform one or more processes, steps and other functions described with implementations, such as described by FIGS. 1-4, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
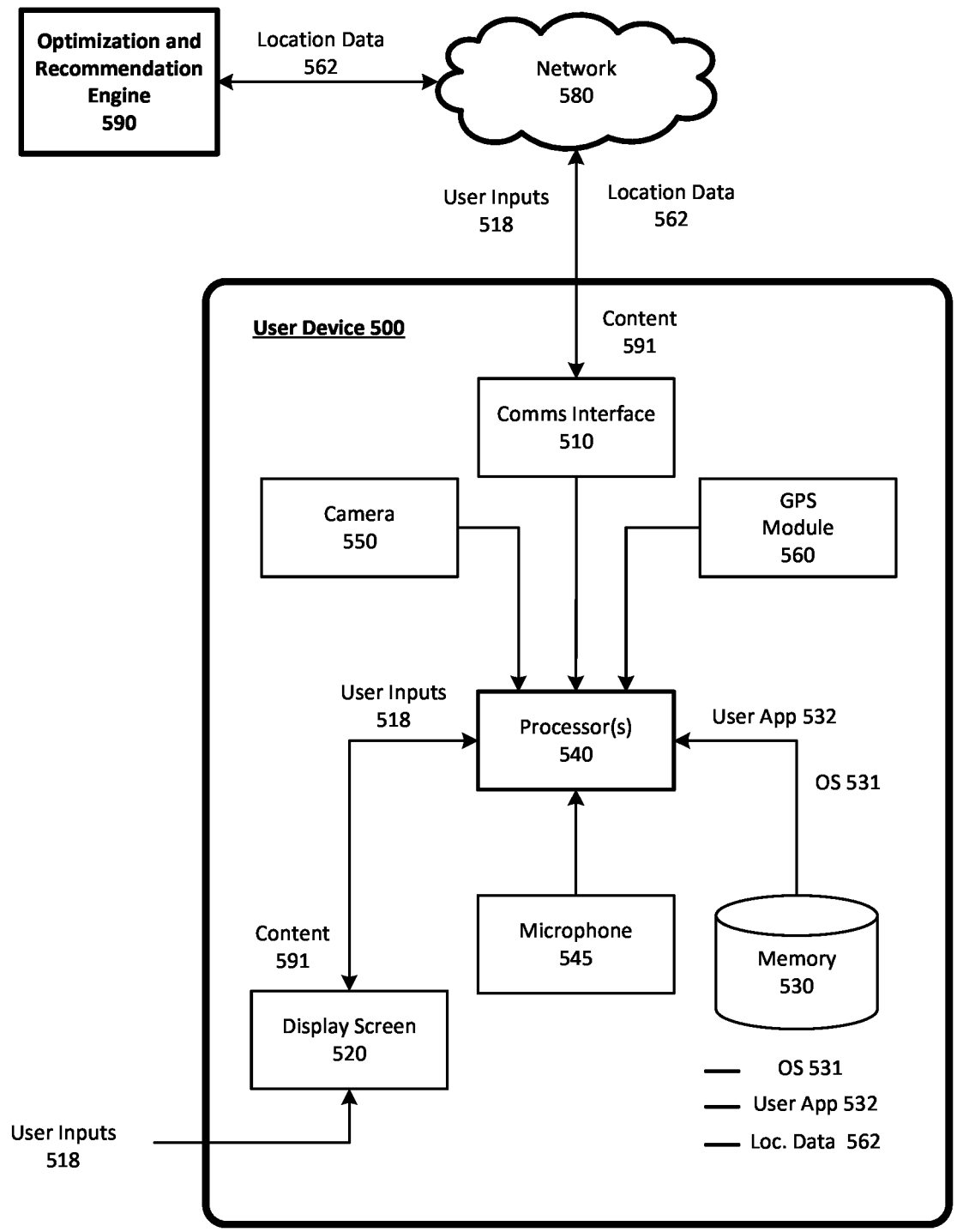
FIG. 5 is a block diagram illustrating an example user device for recording historical location data of a user, as described herein.

FIG. 5 is a block diagram illustrating an example user device for recording historical location data of a user, as described herein. In many implementations, the user device 500 can comprise a mobile computing device, such as a smartphone, tablet computer, laptop computer, smartwatch, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store an operating system (e.g., OS 531) and a designated application (e.g., a user app 532) in a local memory 530. In variations, the memory 530 can store additional applications executable by one or more processors 540 of the user device 500, enabling access and interaction with one or more host servers over one or more networks 580. The OS 531 and/or the user app 532 can cause a GPS module 560 to record location data 562.

In the examples described herein, the location data 562 can be stored within the user device 500 (e.g., on local memory 530). The user device 500 can also transmit the location data 562 to servers over network 580 for storage.

An optimization and recommendation engine 590 can communicate with the user device 500 over the network 580 to receive location data 562 stored in the user device 500. Alternatively, the optimization and recommendation engine 590 can receive location data 562 from the user device 500 via a bus such as a USB connection.

According to embodiments, the user device 500 includes a display screen 520 which can receive user inputs 518. The user inputs 518 can be received by the user device 500 via touch input on the screen 520 or via one or more peripheral devices (e.g., a mouse, a keyboard, etc.) coupled to the user device 500. The user input 518 can include input to customize or alter optimizations performed by the optimization and recommendation engine 590 in determining one or more optimal service routes for the user of the user device 500. In addition, the display screen 520 can display content 591 received from the optimization and recommendation engine 590 regarding the determined one or more optimal service routes. For instance, the display screen 520 can display the one or more optimal service routes on a map. The display screen 520 can also display a set of parameters associated with each of the one or more optimal service routes.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computer system comprising:
   one or more processors; and
   one or more memory resources storing instructions that, when executed by the one or more processors, cause the computer system to:
   determine, based on location data received from a user device of a user, a frequent route of the user;
   determine, based on the frequent route of the user and historical service data associated with completed service requests for a transport service, one or more potential service routes of the transport service to be provided by the user as an alternative to the frequent route, each of the one or more potential service routes being associated with a set of service parameters; and
   transmit a set of content data to the user device to cause the user device to present the one or more potential service routes and content corresponding to the one or more potential service routes of the transport service to be provided by the user, the content including the set of service parameters associated with the one or more potential service routes.

2. The computer system of claim 1, wherein the instructions, when executed by the one or more processors, cause the computer system to:

determine a plurality of candidate service routes of the transport service;

determine, based on the historical service data of the transport service, a plurality of sets of service parameters, each of the plurality of sets of service parameters being associated with a candidate service route of the plurality of candidate service routes of the transport service; and perform multi-variate optimizations of the plurality of sets of service parameters to select the one or more potential service routes from the plurality of candidate service routes.

3. The computer system of claim 2, wherein performing multi-variate optimizations of the plurality of sets of service parameters includes associating a respective weight with each service parameter.

4. The computer system of claim 3, wherein the respective weight associated with each service parameter can be varied based on user input.

5. The computer system of claim 2, wherein the instructions, when executed by the one or more processors, cause the computer system to:

determine, based on the frequent route of the user and the historical service data, a plurality of service-begin regions and a plurality of service-end regions;

wherein each of the plurality of service-begin regions is associated with a candidate service route of the plurality of candidate service routes and wherein each of the plurality of service-end regions is associated with a candidate service route of the plurality of candidate service routes.

6. The computer system of claim 2, wherein performing the multi-variate optimizations includes minimizing a travel time service parameter.

7. The computer system of claim 2, wherein performing the multi-variate optimizations includes maximizing an estimated earnings service parameter.

8. The computer system of claim 1, wherein the content corresponding to the one or more potential service routes of the transport service to be provided by the user presented by the user device further includes a map presentation of the frequent route of the user and a map presentation of the one or more potential service routes of the transport service to be provided by the user.

9. The computer system of claim 1, wherein the content corresponding to the one or more potential service routes of the transport service to be provided by the user presented by the user device further includes a comparison of a first set of service parameters associated with a first potential service route of the one or more potential service routes with a set of characteristics determined for the frequent route of the user.

10. The computer system of claim 9, wherein the comparison includes a comparison of a travel time estimate determined for the first potential service route and a travel time estimate determined for the frequent route of the user.

11. The computer system of claim 1, wherein the instructions, when executed by the one or more processors, cause the computer system to:

determine, based on the location data, a start time of the frequent route of the user; and determine the one or more potential service routes of the transport service to be provided by the user based further on the start time of the frequent route of the user.

12. The computer system of claim 11, wherein the instructions, when executed by the one or more processors, cause the computer system to:

generate a recommendation for an alternate start time for a first potential service routes of the one or more potential service routes, the alternate start time being different than the start time of the frequent route of the user.

13. The computer system of claim 1, wherein determining the one or more potential service routes comprises:

identifying, based on the location data received from the user device, a first set of frequent routes of the user and a second set of frequent routes for the user;

wherein the first set of frequent routes of the user corresponds to driving routes of the user and the second set of frequent routes of the user corresponds to non-driving routes of the user.

14. The computer system of claim 1, wherein the set of service parameters for each of the one or more potential service routes of the transport service includes an estimate of travel distance or travel time for a corresponding potential service route.

15. A computer-implemented method comprising:

determining, based on location data received from a user device of a user, a frequent route of the user;

determining, based on the frequent route of the user and historical service data associated with completed service requests for a transport service, one or more potential service routes of the transport service to be provided by the user as an alternative to the frequent route, each of the one or more potential service routes being associated with a set of service parameters; and transmitting a set of content data to the user device to cause the user device to present the one or more potential service routes and content corresponding to the one or more potential service routes of the transport service to be provided by the user, the content including the set of service parameters associated with the one or more potential service routes.

16. The computer-implemented method of claim 15, further comprising:

determining a plurality of candidate service routes of the transport service;

determining, based on the historical service data of the transport service, a plurality of sets of service parameters, each of the plurality of sets of service parameters being associated with a candidate service route of the plurality of candidate service routes of the transport service; and performing multi-variate optimizations of the plurality of sets of service parameters to select the one or more potential service routes from the plurality of candidate service routes.

17. The computer-implemented method of claim 16, further comprising:

determining, based on the frequent route of the user and the historical service data, a plurality of service-begin regions and a plurality of service-end regions;

wherein each of the plurality of service-begin regions is associated with a candidate service route of the plurality of candidate service routes and wherein each of the plurality of service-end regions is associated with a candidate service route of the plurality of candidate service routes.

18. A non-transitory computer-readable medium storing instructions that, when executed by one or more processors of computer system, cause the computer system to:

determine, based on location data received from a user device of a user, a frequent route of the user;

determine, based on the frequent route of the user and historical service data associated with completed service request for a transport service, one or more potential service routes of the transport service to be provided by the user as an alternative to the frequent route, each of the one or more potential service routes being associated with a set of service parameters; and transmit a set of content data to the user device to cause the user device to present the one or more potential service routes and content corresponding to the one or more potential service routes of the transport service to be provided by the user, the content including the set of service parameters associated with the one or more potential service routes.

19. The non-transitory computer-readable medium of claim 18, wherein the instructions, when executed by the one or more processors, cause the computer system to:

determine a plurality of candidate service routes of the transport service;

determine, based on the historical service data of the transport service, a plurality of sets of service parameters, each of the plurality of sets of service parameters being associated with a candidate service route of the plurality of candidate service routes of the transport service; and perform multi-variate optimizations of the plurality of sets of service parameters to select the one or more potential service routes from the plurality of candidate service routes.

20. The non-transitory computer-readable medium of claim 19, wherein the instructions, when executed by the one or more processors, cause the computer system to:

determine, based on the frequent route of the user and the historical service data, a plurality of service-begin regions and a plurality of service-end regions;

wherein each of the plurality of service-begin regions is associated with a candidate service route of the plurality of candidate service routes and wherein each of the plurality of service-end regions is associated with a candidate service route of the plurality of candidate service routes.

\* \* \* \* \*